United States Patent

Jones

[15] 3,648,659
[45] Mar. 14, 1972

[54] ARTICLE OF MANUFACTURE

[72] Inventor: Roy A. Jones, 5600 Ridgeway, Kansas City, Mo. 64133

[22] Filed: June 8, 1970

[21] Appl. No.: 44,264

[52] U.S. Cl..................................................119/1, 248/158
[51] Int. Cl. .....................................................A01k 45/00
[58] Field of Search ....................119/1, 73; 47/34, 39, 41.1; 248/154, 158; 108/150, 159

[56] References Cited

UNITED STATES PATENTS

| 1,895,702 | 1/1933 | Burley | 119/1 |
| 3,170,439 | 2/1965 | Juenger | 119/73 |
| 1,806,123 | 5/1931 | Smith | 119/1 |
| 3,084,666 | 4/1963 | Plaisance | 119/1 |
| 3,231,229 | 1/1966 | Morella | 47/39 X |

*Primary Examiner*—Hugh R. Chamblee
*Attorney*—Fishburn, Gold and Litman

[57] ABSTRACT

An article of manufacture comprising a top member mounted on an upper end of a pedestal with electric heating elements and a thermostat recessed in the bowl structure. A connection is adapted to be made to the heating elements whereby the heating elements operate during cold weather to heat water in the bowl to maintain a temperature sufficient to prevent freezing.

9 Claims, 5 Drawing Figures

Patented March 14, 1972
3,648,659
2 Sheets-Sheet 1
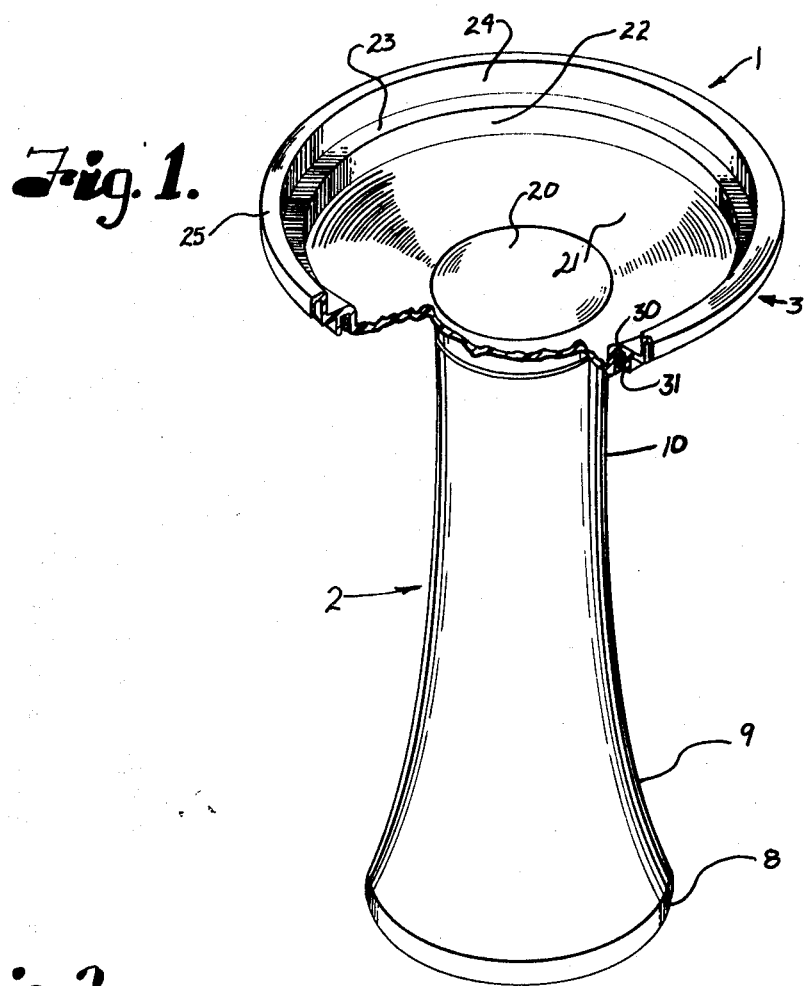
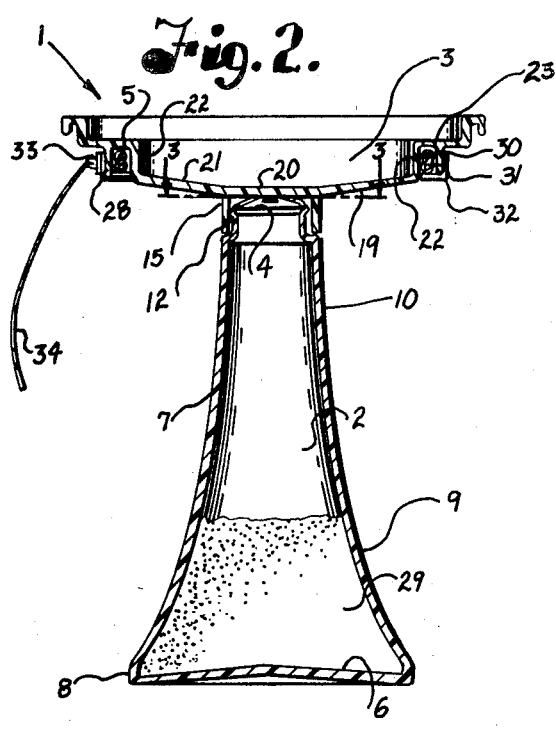
INVENTOR.
Roy A. Jones
BY
Fishburn, Gold & Litman
ATTORNEYS Patented March 14, 1972  3,648,659

INVENTOR.
Roy A. Jones
BY
Fishburn, Gold & Litvin
ATTORNEYS

ARTICLE OF MANUFACTURE

The present invention relates to articles of manufacture having a pedestal and a top member mounted thereon and having an upwardly open compartment therein, such as bird baths and more particularly to a bird bath having a structure for keeping water at a temperature sufficient to prevent freezing during cold weather so as to provide birds a water supply in the winter. The upwardly open compartment of the top member of the article of manufacture may be formed in any desired shape for receiving and supporting various articles therein and may be formed into a bowl to receive and retain water therein.

It is well known that many species of birds remain in northern areas during the winter months and people provide increasing availability of feed, as by bird feeders placed on residential lawns and the like. However, the birds need drinking water which is difficult to supply during cold weather even if people frequently fill their bird baths. It is also well known that certain species of birds must bathe regularly to remove parasites and the like. The bird bath of the present invention fulfills a humane purpose especially during freezing temperatures of the cold winter months of supplying bathing and drinking water to birds.

The principal objects of the present invention are: to provide a bird bath having heating elements engaging a bowl portion thereof to maintain water therein at a temperature above freezing particularly during the cold winter months; to provide such a structure with a thermostat whereby the heating elements operate to maintain the water temperature within a desired range; to provide such a heated bird bath which is formed of a suitable synthetic resin material which resists the growth of mold and other micro-organisms; to provide such a bird bath wherein the heating elements are recessed adjacent the bowl periphery and the heating elements have a separable connection for connecting the heating elements to a source of current so no wires or the like extend to the bird bath during warmer weather; to provide such a bird bath which is adapted for year around use; and to provide such a bird bath of simple construction which is light in weight, stable when assembled, strong and durable in use, easily assembled, and particularly well adapted for the proposed use.

Other objects and advantages of this invention will become apparent from the following description taken in connection with the accompanying drawings wherein are set forth by way of illustration and example certain embodiments of this invention.

FIG. 1 is a perspective view of a bird bath embodying features of the present invention.

FIG. 2 is a transverse sectional view through the bird bath.

Figure 3:
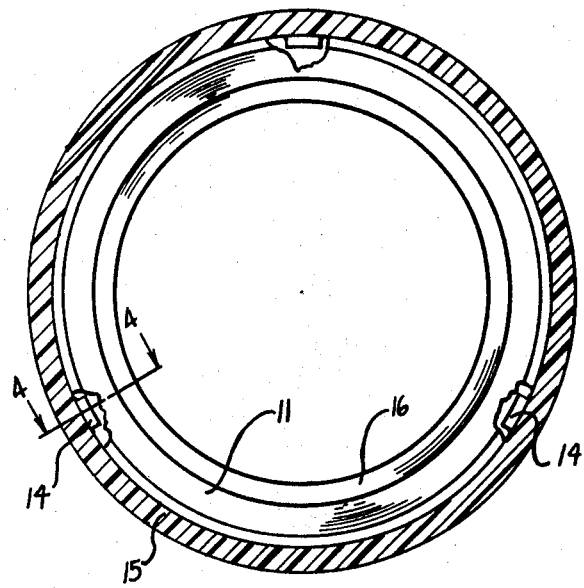
FIG. 3 is a sectional view taken on line 3—3, FIG. 2 and showing cooperating portions on a bowl and pedestal for mounting and maintaining the bowl on an upper end of the pedestal.
Figure 4:
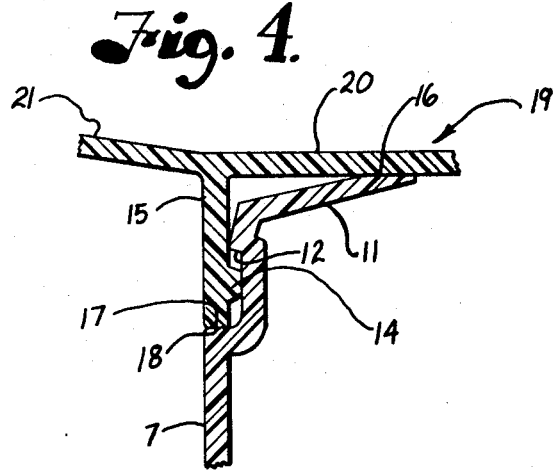
FIG. 4 is an enlarged fragmentary sectional view taken on line 4—4, FIG. 3.
Figure 5:
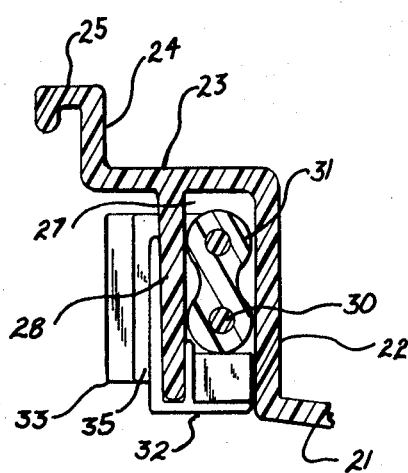
FIG. 5 is an enlarged fragmentary sectional view showing a structure for mounting heating elements and a thermostat for controlling heating of water in the bowl.

Referring more in detail to the drawings:

The reference numeral 1 generally designates a bird bath having an upstanding pedestal 2 and a bowl 3 mounted on an upper end 4 of the pedestal 2. The bowl 3 has a structure accommodating a heating unit 5 operative to heat water in the bowl 3 to maintain the water at a temperature above freezing thereby providing drinking and bathing water for birds during the cold winter months.

The pedestal 2 is a generally upstanding member having a bottom wall 6 and a side wall 7 extending upwardly from the periphery of the bottom wall 5 to define an open or hollow pedestal. The pedestal 2 may be of any desired shape and in the illustrated structure, it is generally circular in horizontal section and the side wall 7 is shaped to form a cylindrical lower or base portion 8 adjacent the bottom wall 6. The side wall 7 extends upwardly and inwardly from the base portion 8 to define a frustoconical portion 9. The side wall 7 extends upwardly from the frustoconical portion 9 to define a generally cylindrical upper portion 10 terminating at an inwardly and upwardly directed flange 11 which defines the upper end 4.

The bowl 3 and the upper end 4 of the pedestal 2 have cooperating portions thereon for mounting and maintaining the bowl 3 on the upper end 4 of the pedestal 2. In the illustrated structure, the pedestal 2 has a downwardly facing shoulder 12 adjacent the upper end 4 thereof and the shoulder 12 extends upwardly and outwardly from the pedestal 2 for engagement by a plurality of circumferentially spaced projections 14 each extending from an annular flange 15 depending from the bowl 3, as later described. The pedestal 2 slopes upwardly and inwardly from the downwardly facing shoulder 12 toward the upper end 4 to guide the projection 14 toward the downwardly facing shoulder 12 when the bowl 3 is mounted on the pedestal 2.

The flange 11 at the upper end of the pedestal 2 has an end portion 16 positioned and shaped to engage and support the bowl 3 when same is mounted on the pedestal 2. The side wall 7 of the pedestal 2 has an upwardly facing shoulder 17 positioned below the downwardly facing shoulder 12 for engagement by a lower edge 18 of the annular flange 15 whereby the end portion 16 and the upwardly facing shoulder 17 support the bowl 3 and the water therein when the bowl is mounted on the upper end 4 of the pedestal 2.

It is desirable to provide a pedestal designed to facilitate placing and leveling thereof, therefore, the bottom wall 6 is an upwardly concave member whereby the pedestal 2 is supported adjacent the periphery of the bottom wall 6 thereby facilitating placing and leveling pedestal 2.

The bowl 3 is removably mounted on the upper end 4 of the pedestal 2 and the bowl 3 may be of any desired shape having a portion shaped to retain water therein. In the illustrated structure, the bowl 3 has a bottom wall 19 having a generally flat or level center portion 20 positioned within the annular flange 15 and the bottom wall 19 has an upwardly and outwardly extending edge portion 21. The illustrated bowl is generally circular and an annular edge wall 22 extends upwardly from the periphery of the edge portion 21 of the bottom wall 19 to define a water retaining portion of the bowl 3.

The edge wall 22 has a rim portion extending therefrom and the illustrated rim portion includes an annular flange 23 extending outwardly from an upper edge of the edge wall 22. A lip or wall 24 extends upwardly from the periphery of the annular flange 23 to define an upper enlarged water retaining portion within the bowl 3. The lip or wall 24 has a flange 25 extending outwardly from the upper edge thereof with the flange 25 being sized to provide an ideal support for the feet of birds using the bird bath 1.

It is desirable to prevent water within the bowl 3 of the bird bath 1 from freezing to thereby provide a relatively constant source of drinking and bathing water for birds during freezing temperatures of the cold winter months, therefor, the heating unit 5 is provided to heat the water in the bowl 3 to maintain the water at a temperature above freezing. It is preferable to place the heating unit 5 in engagement with the water retaining portion of the bowl 3 and, in the illustrated structure, the bowl 3 has members thereon to form a downwardly open recess 27 adjacent the edge wall 22 of the water retaining portion of the bowl 3 and the heating unit 5 is mounted in the recess 27 and is operative to heat the water retaining portion of the bowl 3 and the water therein.

In the illustrated structure, an annular wall 28 depends from the annular flange 23 and is in spaced substantially parallel relation with the edge wall 22 to define the downwardly open recess 27 on the bowl 3. When the heating unit 5 is mounted within the downwardly open recess 27, the heating unit 5 is protected from the weather and from tampering.

Plastics, particularly synthetic resins, such as polyethylene and the like, have been found to resist decay, the growth of mold and other micro-organisms thereon. Therefore, it is desirable to mold the pedestal 2 and the bowl 3 of a suitable synthetic resin for both long life and sufficient resilience between the annular flange 15 having the projections 14 thereon and the upper end 4 of the pedestal 2 to permit the projections 14 to move over the upper end 4 and engage the downwardly facing shoulder 12.

Molding the pedestal 2 and bowl 3 of suitable synthetic resins produces an extremely light weight structure for the bird bath 1, therefore, it is necessary to provide additional weight particularly within the pedestal 2 for effecting a stable structure. In the illustrated structure, suitable ballast material 29, such as sand, gravel, soil, concrete or the like is placed within the pedestal 2 through the open upper end 4 to thereby increase the stability of the pedestal 2 and the bird bath 1.

The heating unit 5 is particularly adapted for heating the synthetic resin of the bowl 3 to a temperature to maintain water therein at a temperature above freezing. In the illustrated structure, the heating unit 5 includes one or more heating elements 30, such as suitable metal wires or rods, which are enclosed within a suitable heat stable synthetic resin material providing a flexible plastic sheath 31 sized to substantially occupy the full space of the downwardly open recess 27.

It is desirable to provide means adjacent the downwardly open recess 27 for supporting the heating unit 5 in a position within the recess 27 and in engagement with the edge wall 22 of the water retaining portion of the bowl 3, therefore, suitable clips 32 are mounted on a lower edge of the annular wall 28 for supporting the sheath 31 of the heating unit 5. Suitable grout or caulking material could be positioned between the annular wall 28 and the edge wall 22 to enclose the heating unit 5 within the downwardly open recess 27.

Electrical current is operative to energize the heating element 30 of the heating unit 5, therefore, the heating unit 5 includes a suitable receptacle 33 adapted to receive the prongs of a male end of a plug of a suitable electrical cord 34 whereby electrical current is supplied to the heating elements 30 for activating same to maintain water within the bowl 3 at a temperature above freezing.

It is desirable to turn off the heating unit 5 at an upper temperature below that which will effect softening of the bowl 3, therefore, a suitable thermostat 35 is operatively connected to or mounted on the heating element 30 whereby the heating unit 5 will be deactivated at a temperature sufficiently below a temperature which will effect softening of melting of the resinous material of the bowl 3 or the sheath 31 of the heating unit 5.

In use, the pedestal 2 is positioned at a desired location, such as on a lawn, within a flower garden, rose bed or the like. The pedestal 2 is leveled on the bottom wall 6 and the ballast material 29 is placed within the pedestal 2 and the bowl 3 is mounted on the upper end of the pedestal 2. The bowl 3 is centered over the pedestal 2 with the annular flange 15 surrounding the upper end 4 of the pedestal 2. The bowl 3 is lowered thereby moving the projections 14 into engagement with the upper portion of the side wall 7 above the downwardly facing shoulder 12 whereby the annular flange 15 and the upper portion of the side wall 7 bend sufficiently to permit the projections 14 to move below the downwardly facing shoulder 12. The center portion 20 of the bottom wall 19 is moved into engagement with the end portion 16 of the flange 11 and the lower edge 18 of the annular flange 15 is moved into engagement with the upwardly facing shoulder 17 on the side wall 7 of the pedestal 2, thereby firmly mounting the bowl 3 on the upper end 4 of the pedestal 2. The heating unit 5 is mounted in the downwardly open recess 27 and the clips 32 are mounted on a lower edge of the annular wall 28 to support the heating unit 5 within the recess 27. A suitable caulking or grout material could be used to fill a lower portion of the recess 27 to hold the sheath 31 therein to protect the heating unit 5 from the elements. The prongs of a male plug of the electrical cord 34 are mounted in the receptacle 33 of the heating unit 5 thereby preparing same to maintain water placed in the bowl 3 at a temperature above freezing. During the warm weather of spring, summer and fall the electrical cord 34 is disconnected and removed.

It is to be understood that while I have illustrated and described one form of my invention, it is not to be limited to the specific form or arrangement of parts herein described and shown.

What I claim and desire to secure by Letters Patent is:
1. A bird bath comprising:
   a. a pedestal having a cylindrical upper end portion;
   b. a bowl having a portion thereof shaped to retain water therein;
   c. a downwardly facing shoulder on said pedestal adjacent the upper end thereof;
   d. an annular flange depending from a bottom wall of said bowl; and
   e. a plurality of circumferentially spaced projections extending from said annular flange, said projections being engageable with said downwardly facing shoulder to retain said bowl on said pedestal.
2. The bird bath as set forth in claim 1 including:
   a. members on said bowl positioned to form a downwardly open recess adjacent said water retaining portion; and
   b. a heating unit mounted in said recess and operative to heat said water retaining portion of said bowl to maintain water therein at a temperature above freezing.
3. The bird bath as set forth in claim 2 wherein:
   a. said bowl has a bottom wall and an annular edge wall upstanding from the periphery of the bottom wall;
   b. said edge wall has a rim portion extending therefrom; and
   c. said rim portion has an annular wall depending therefrom in spaced substantially parallel relation with said edge wall to define the downwardly open recess on said bowl.
4. The bird bath as set forth in claim 3 wherein:
   a. said pedestal is hollow and said pedestal and bowl are formed of plastic; and
   b. said pedestal has a closed lower end and an open upper end to receive ballast material to increase the stability of the bird bath.
5. The bird bath as set forth in claim 2 wherein:
   a. said heating unit is an annular member;
   b. said heating unit comprises a heating element enclosed within a flexible plastic sheath; and
   c. said heating unit has temperature responsive means for controlling the heating element to maintain the temperature thereof between selected limits.
6. An article of manufacture comprising:
   a. a pedestal formed of synthetic resin and having wall portions defining a base portion and an upper end;
   b. a top member formed of synthetic resin and mounted on the upper end of said pedestal and having a bottom wall portion and upwardly open compartment therein;
   c. a flange depending from said bottom wall of said top member and positioned to define wall portions receiving the upper end of said pedestal therein;
   d. a shoulder formed on one of the flange of the top member and wall portions of said pedestal; and
   e. a plurality of spaced projections extending from the other of said flange and wall portion and positioned to engage said shoulder and cooperate therewith for retaining said top member on the upper end of said pedestal, said flange yielding and permitting the projections to pass the shoulder as the upper end of the pedestal is moved within said flange.
7. An article of manufacture as set forth in claim 6 including a heating unit mounted within the wall portions of said top member and operative to heat the upwardly open compartment therein to maintain same at a temperature above freezing whereby water within the upwardly open compartment will be maintained in liquid form.
8. A bird bath comprising:
   a. a pedestal;
   b. a bowl having a portion shaped to retain water therein;
   c. cooperating portions on said bowl and pedestal for mounting and maintaining said bowl on an upper end of said pedestal and including a downwardly facing shoulder on said pedestal adjacent an upper end thereof, an annu- lar flange depending from a bottom wall of said bowl, and a plurality of circumferentially spaced projections extending from said annular flange, said projections being engageable with said downwardly facing shoulder to retain said bowl on said pedestal;

d. members on said bowl positioned to form a downwardly open recess adjacent said water retaining portion; and e. a heating unit mounted in said recess and operative to heat said water retaining portion of said bowl to maintain water therein at a temperature above freezing.

9. A bird bath comprising:

a. a pedestal;

b. a bowl having a portion shaped to retain water therein, said portion having a peripheral wall;

c. cooperating portions on said bowl and pedestal for mounting and maintaining said bowl on an upper end of said pedestal;

d. an annular wall on said peripheral wall and having a portion spaced therefrom and cooperating therewith to define a downwardly opening recess around the water retaining portion;

e. an annular heating unit in said recess, said heating unit comprising a heating element enclosed within a flexible plastic sheath, said heating element being operative to heat said water retaining portion of said bowl to maintain water therein at a temperature above freezing;

f. means engaging said walls adjacent the opening of said recess for retaining the heating unit in said recess;

g. a temperature responsive means controlling the heating element to maintain the temperature thereof between selected limits.

\* \* \* \* \*